United States Patent [19]
Buice et al.

[11] 3,828,423
[45] Aug. 13, 1974

[54] SELF-BONDING CAPACITOR CASE INSULATION

[75] Inventors: Joel B. Buice; David G. Schwenker, both of Columbia, S.C.

[73] Assignee: General Electric Company, Owensboro, Ky.

[22] Filed: July 16, 1973

[21] Appl. No.: 379,570

Related U.S. Application Data

[62] Division of Ser. No. 284,440, Aug. 28, 1972, Pat. No. 3,778,683.

[52] U.S. Cl. ............................................. 29/570
[51] Int. Cl. ........................................... B01j 17/00
[58] Field of Search .................................... 29/570

[56] References Cited
UNITED STATES PATENTS
3,330,999   7/1967   Hellicar ........................... 317/230
3,475,659   10/1969  Buice .............................. 317/230
3,573,566   4/1971   Fournier .......................... 29/570
3,597,664   8/1971   Villani ............................ 29/570

*Primary Examiner*—W. Tupman
*Attorney, Agent, or Firm*—N. J. Cornfeld; D. A. Dearing; F. L. Neuhauser

[57] ABSTRACT

An improved aluminum electrolytic capacitor is provided having an electrically insulating coating securely bonded to the casing. The coating comprises an epoxy resin preferably applied as a powder and cured to the empty casing at an elevated temperature to secure a proper bond without damage to the electrical components subsequently assembled therein.

3 Claims, 4 Drawing Figures

PATENTED AUG 13 1974 3,828,423

SELF-BONDING CAPACITOR CASE INSULATION

This is a division of application Ser. No. 284,440, filed Aug. 28, 1972 and now Pat. No. 3,778,683.

BACKGROUND OF THE INVENTION

This invention relates to capacitors and more particularly to an improved aluminum electrolytic capacitor.

Aluminum electrolytic capacitors are usually constructed with an outer aluminum metal casing or can either not actively connected to either electrode, connected to cathode (called common cathode or negative connection), or connected to the anode (called common positive connection). In either event the metal casing is exposed, internally, to the electrolyte and is thus either positively connected or electrically coupled, to some extent, to the electrodes. Furthermore, inadvertent shorting of the casing to an external lead attached to one of the terminals can, particularly in high voltage applications, provide an unsafe condition.

It has therefore become the practice, in the aluminum electrolytic capacitor art to insulate the can or casing by placing a slip-on heat-shrinkable plastic sleeve, or other slip-on insulation around the metal can.

This approach has not been altogether satisfactory. The materials do not usually bond to the casing—or at least do not form a uniform bond resulting in voids between the casing and the insulation whereby solvents, moisture, and other materials may become trapped or held in place by capillary action resulting, in some instances, in corrosive attack of the metal casing. When a plastic sleeve is heat-shrunk over the casing—without bonding—the resultant insulating layer is more prone to puncture during subsequent mounting of the capacitor using standard mounting brackets.

While an adherent insulating coating would appear to be a desirable alternative, the electrical insulation and mechanical requirements of the coating limits the number of materials which can be used. Furthermore, many materials which normally adhere to other metals do not bond well to aluminum. Other coatable materials, having the required electrical and mechanical characteristics, must be applied, to form a satisfactory bond, at temperatures which can be damaging to the internal capacitor elements within the casing.

It is therefore an object of this invention to provide an improved aluminum electrolytic capacitor having an electrically insulating material bonded to the outer metal surfaces thereof.

It is another object of the invention to provide an improved capacitor structure wherein the casing is first coated with an insulation before assembly, and the uncoated end edges of the casing are subsequently crimped into the insulated cover to completely encapsulate the metal portions of the casing.

These and other objects of the invention will be apparent from the description and the drawings.

DESCRIPTION OF THE PREFERRED EMBODIMENT

Figure 1:
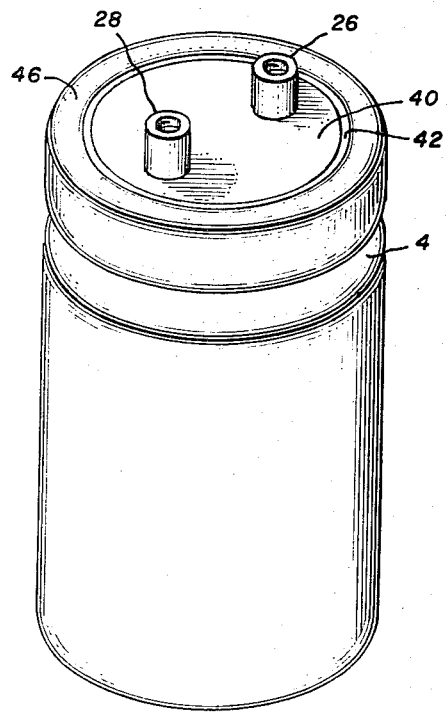
FIG. 1 is an isometric view of the capacitor of the invention.

Referring now to the drawing, in accordance with the invention an aluminum can or casing is provided which, in the illustrated embodiment, comprises a cylindrical casing 2. Casing 2 is provided with a circumferential groove or dimple 4 which provides an internal shoulder to support an insulated end member or cover 40 as will be described in more detail below. In accordance with the invention, an adherent insulating coating 30 is applied and bonded to the exterior of casing 2 before assembly of the remaining components within the casing.

As shown in FIG. 1, coating 30 completely covers the sidewalls 2a of casing 2 as well as end wall 6. The open end edges 2b are not intentionally coated since the edges are embedded into an elastomer seal 42 on cover 40 during crimp or finally case closure. The interior of the casing is not coated since such coating could interfere with the functional performance of the capacitor.

The epoxy coating of casing 2 comprises a cured epoxy resin bonded to the casing. The resin is preferably applied as a powder by electrostatic coating means wherein the powder is charged; the casing 2 is held at a ground potential; and the particles are attracted to the grounded casing. The coated casing is then placed in an oven and heated to a temperature of about 180–220°C. for about 5 minutes. This period of time has been found sufficient, at this temperature, to melt and cure the epoxy resin to form a tightly adhering coating on the aluminum can. This, it should be noted, is in sharp contrast to conventional room temperature curing epoxies, such as potting compounds which have been found for reasons not entirely understood to form a very poor bond with aluminum metal.

The epoxy material to be used preferably is in powder form having suitable catalysts contained in the powders to provide for curing of the resin at a temperature of about 180–220°C in a short period of time, for example, about 5 minutes. Longer curing time periods could be used provided no undesirable coating degradation occurred. The coating material must have a dielectric breakdown of at least 4 kilovolts DC, preferably as high as 9–13 kilovolts DC when coating is applied in a thickness of about 6–10 mils. It should also have an insulation resistance of about 10,000 megohms when applied in a coating thickness of about 6–10 mils. Examples of epoxy materials which have been found to be satisfactory include Hysol DK8 and Minnesota Mining and Manufacturing Company XR5212. Other materials, of course, having the above electrical and mechanical properties may be substituted therefor.

Figure 3:
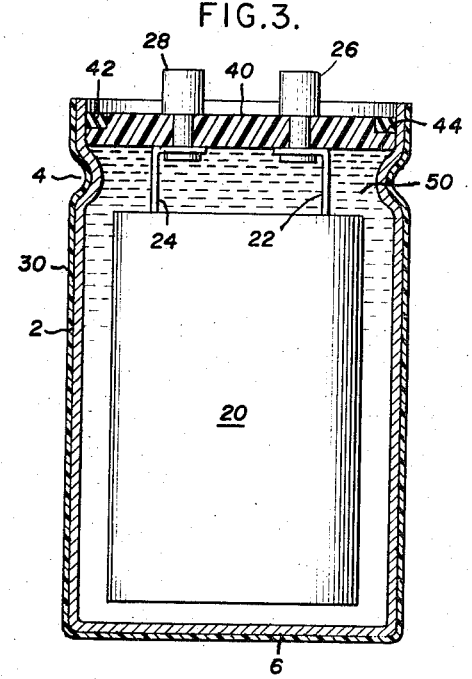
FIG. 3 is a cross-sectional view of the casing of FIG. 2 with the capacitor section and insulated cover, but before sealing.
Figure 2:
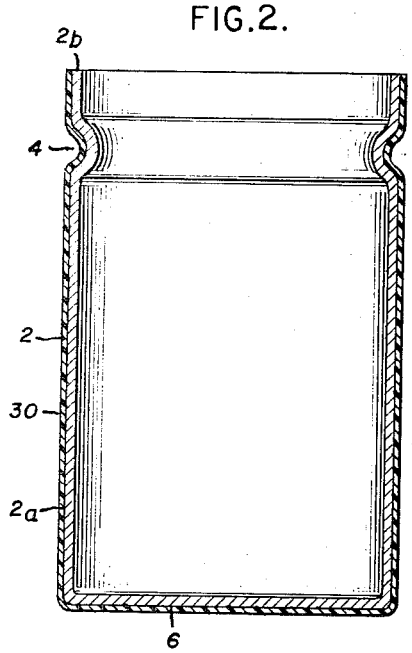
FIG. 2 is a cross-sectional view of the coated casing.

After coating 30 has been bonded to casing 2, the capacitor is assembled by insertion of capacitor section assembly 20 into casing 2 as shown in FIG. 3. Assembly 20 in the illustrated embodiment comprises a roll of convolutely wound, film forming metal electrode foils separated by paper or other dielectric material and treated with a suitable electrolyte such as boric acid. The electrode foils are respectively connected to lead members 22 and 24 which are, in turn, attached to terminals 26 and 28 in insulated cover member 40. Capacitor section assembly 20, although illustrated as a cylindrical roll, may comprise any convenient geometrical shape such as, for example, a rectangular parallelopiped, stacked foil (book style), or combined sections of cylindrical, rectangular or stacked shapes.

Figure 4:
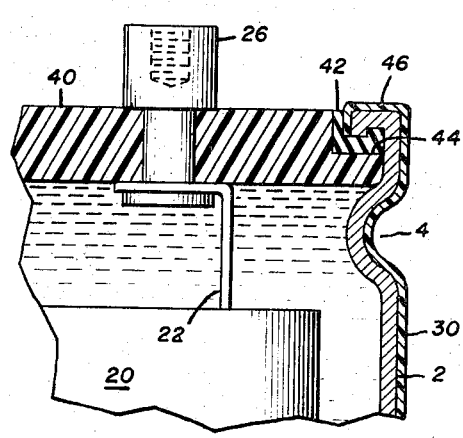
FIG. 4 is a fragmentary cross-sectional view of the sealed capacitor.

As stated earlier, the epoxy must be applied to the can before formation of the final capacitor due to the required high temperature for curing to effect the required bond between the epoxy and the aluminum can, as seen in the drawings. It is therefore necessary, when finally assembling the can, to ensure that the crimped or rolled-over portion of casing 2, generally indicated at 46 in FIG. 4, provides an electrolyte-tight seal with the insulating cover 40 without disturbing the bond between the epoxy coating 30 and the metal casing 2 as it is crimped over into the insulating cover 40. Thus, it is necessary to use a flexible coating material which will remain tightly bonded to the metal even during subsequent bending of the casing without thinning the coating material to an extent where the electrical and/or physical properties of the material may be changed.

It will be noted, particularly in FIGS. 3 and 4, that an elastomer gasket 42, preferably of quadrangular cross-section, is provided in a peripheral groove 44 in cover 40. To seal the capacitor, the edge 2b of the casing or can is rolled over into the gasket material 42 so that the end edge of casing 2 is not exposed. The entire outer exposed surface of the casing, then, is completely covered by a tightly adhering material having the desired electrical characteristics, as well as bonding characteristics.

The capacitor of the invention, then, comprises an aluminum casing which has been coated with an adherent coating of epoxy resin cured at an elevated temperature before final assembly of the capacitor. The assembled capacitor having the electrodes and electrolyte therein is sealed by crimping or rolling the end edge of the open end of the coated aluminum can into a resilient sealing gasket portion of the insulating cover to provide a finished capacitor having an aluminum can casing wherein all exterior or outer metallic portions of the casing have been completely encapsulated in an insulating material having sufficient insulating properties to withstand high voltages which may be encountered during operation of the device. Thus, the strength and rigidity, as well as chemical resistance to the internal electrolyte, of an aluminum can is retained, and yet the insulating properties formerly obtained only by providing unbonded sleeves around the can is provided by a self-bonding coating providing superior electrical insulation properties and mechanical strength.

What we claim as new and desire to secure by Letters Patent of the United States is:

1. A process for the manufacture of an improved aluminum electrolytic capacitor comprising steps of:
   a. forming an aluminum casing with a first closed end and a second open end;
   b. cleaning the outer surface of the aluminum casing;
   c. electrostatically coating the outer surfaces of the aluminum casing with a powdered epoxy material having a dielectric breakdown of from 4–13 KVDC and an insulation resistance of approximately 10,000 megohms when applied as a coating 6–10 mils thick;
   d. curing the coated epoxy casing at an elevated temperature;
   e. inserting a capacitor element, comprising active electrodes attached to terminals contained on an insulated disc, within the open end of the casing; and
   f. sealing the end edges of the open end of the casing to the insulated disc to completely encapsulate the outer metallic portions of the aluminum casing to provide the desired electrical and mechanical properties of the capacitor.

2. The process of claim 1 wherein said epoxy is cured and bonded to said aluminum casing at a temperature of about 180–220°C.

3. The process of claim 1 wherein said end edges of said casing are urged into sealing engagement with a resilient gasket on said cover.

* * * * *